US010103940B2

(12) United States Patent
Dumet et al.

(10) Patent No.: US 10,103,940 B2
(45) Date of Patent: Oct. 16, 2018

(54) LOCAL NETWORK AND METHOD OF UPDATING A DEVICE IN A LOCAL NETWORK

(71) Applicant: THOMSON LICENSING, Issy les Moulineaux (FR)

(72) Inventors: Sylvain Dumet, Concord, NC (US); Dirk Van De Poel, Aartselaar (BE)

(73) Assignee: Thomson Licensing, Issy-les-Moulineaux (FR)

( * ) Notice: Subject to any disclaimer, the term of this patent is extended or adjusted under 35 U.S.C. 154(b) by 215 days.

(21) Appl. No.: 14/900,134

(22) PCT Filed: Jun. 4, 2014

(86) PCT No.: PCT/EP2014/061582
§ 371 (c)(1),
(2) Date: Dec. 18, 2015

(87) PCT Pub. No.: WO2014/202387
PCT Pub. Date: Dec. 24, 2014

(65) Prior Publication Data
US 2016/0142247 A1    May 19, 2016

(30) Foreign Application Priority Data
Jun. 18, 2013   (EP) .................................... 13305822

(51) Int. Cl.
G06F 15/177    (2006.01)
H04L 12/24    (2006.01)
G06F 8/65    (2018.01)

(52) U.S. Cl.
CPC .............. *H04L 41/082* (2013.01); *G06F 8/65* (2013.01)

(58) Field of Classification Search
CPC .................................. H04L 41/082; G06F 8/65
(Continued)

(56) References Cited

U.S. PATENT DOCUMENTS

2004/0083471 A1    4/2004  Nam et al.
2008/0127166 A1    5/2008  Cockburn et al.
(Continued)

FOREIGN PATENT DOCUMENTS

CN    101072292    11/2007
EP    2234016    9/2010
(Continued)

OTHER PUBLICATIONS

The Broadband Forum: "TR-069 CPE WAN Management Protocol"; Protocol version 1.3; Jul. 2011, pp. 1-190.
Search Report dated Oct. 6, 2014.

*Primary Examiner* — Chris Parry
*Assistant Examiner* — Weiwei Stiltner
(74) *Attorney, Agent, or Firm* — Myers Wolin LLC (57) ABSTRACT

A method of updating at least two interconnected devices in a local network, a local network comprising at least two interconnected devices and a method of operating a remote management client and a device in this local network are provided. A resource location information of an update archive is communicated from a remote management client in the local network to the other devices in said network. The devices participating in the update communicate participation acknowledgement messages to the remote management client. The participating devices determine whether a next one of a predefined sequence of update statuses is reached. They notify the other participating devices that this update status has been reached and pause until all other participating devices have notified that they also have reached the same update status.

15 Claims, 7 Drawing Sheets (58) Field of Classification Search
USPC .......................................................... 709/221
See application file for complete search history.

(56) References Cited

U.S. PATENT DOCUMENTS

| | | |
|---|---|---|
| 2008/0160983 A1 | 7/2008 | Poplett et al. |
| 2008/0168434 A1 | 7/2008 | Gee et al. |
| 2012/0159121 A1* | 6/2012 | Inoue ................ G06F 15/17325 |
| | | 712/30 |
| 2013/0298117 A1* | 11/2013 | Reynolds .................. G06F 8/68 |
| | | 717/173 |

FOREIGN PATENT DOCUMENTS

| | | |
|---|---|---|
| EP | 2241479 | 10/2010 |
| KR | 1020060076645 | 7/2006 |
| KR | 1020070005291 | 1/2007 |
| WO | WO2010145252 | 12/2010 |
| WO | WO2011087076 | 7/2011 |

\* cited by examiner

LOCAL NETWORK AND METHOD OF UPDATING A DEVICE IN A LOCAL NETWORK

This application claims the benefit, under 35 U.S.C. § 365 of International Application PCT/EP2014/061582, filed Jun. 4, 2014, which was published in accordance with PCT Article 21(2) on Dec. 24, 2014 in English and which claims the benefit of European patent application No. 13305822.2, filed Jun. 18, 2013.

FIELD OF THE INVENTION

The invention relates to a local network, a method of updating at least two interconnected devices in a local network and to a computer program product, which causes a local network to perform said method. Furthermore, the invention relates to a method of operating a remote management client and to a method of operating a device in this local network.

BACKGROUND

In modern local networks, for example at a facility or production site, in particular in home networks, the number of customer premises equipment is steadily increasing. This is particularly true for modern connected homes. This entails a continuously increasing complexity of the local network, because more and more functions are embedded in a single device. This ever-growing complexity and interconnectivity of the devices increases the dependencies between these devices in the local network. In a modern connected home, this situation can impact the data communication between the individual devices. When one of the home devices runs an older system software version than the other, the devices may no longer be able to communicate with each other because the firmware versions are not compatible with each other. The situation becomes even more critical during a firmware update or upgrade process.

In a home network system having multiple interconnected devices, firmware updates of the devices are traditionally performed in an unmanaged and unsynchronized way. A typical prior art network system 2 is for example illustrated in FIG. 1. There is a local network 4, for example a home network, comprising an arbitrary number N of devices 6, in particular home devices, namely: "Device 1", "Device 2". . . "Device N". Each device 6 establishes an individual connection to a dedicated remote management server 8, which is in charge of providing the firmware update for the corresponding device 6. The data link is typically established via the internet 10. There is a first remote management server: "Mgmt server 1", which provides the firmware update for the first device (Device 1). Similarly, there is a $2^{nd}$ and $n^{th}$ remote management server (Mgmt server 2, Mgmt server N), providing the firmware update for the $2^{nd}$ to $n^{th}$ device 6. A frequently known communication protocol, which defines on how the communication between the device 6 and the remote management server 8 is performed, is the TR-069 standard.

Figure 1:
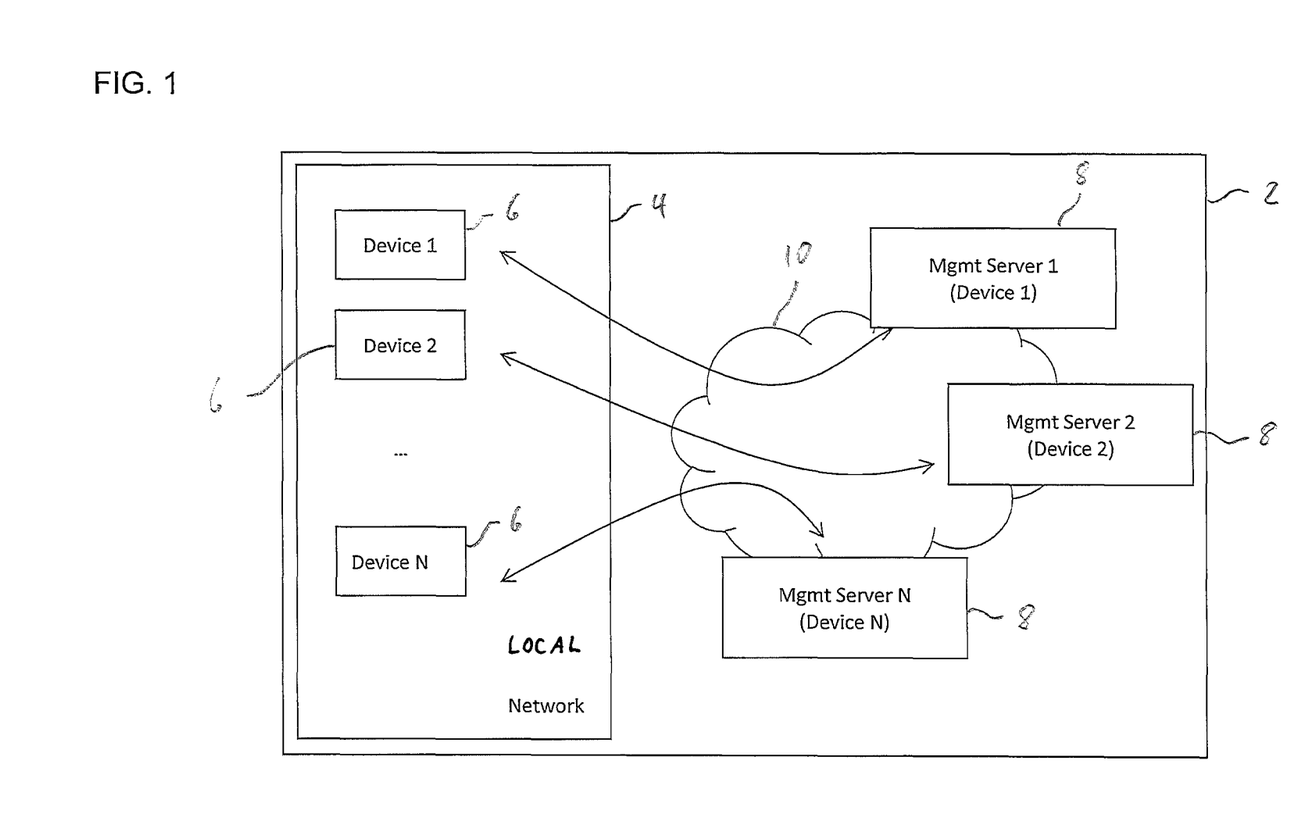
FIG. 1 is a simplified network system comprising a local network, according to the prior art.

Each device 6 in the local network 4 performs a system software update upon reception of an update request from the corresponding remote management server 8. The unmanaged and unsynchronized system software update can, however, cause severe problems with respect to the interconnectivity between the devices 6. A situation when a first device 6 performs a restart while a second device 6 still downloads the firmware image cannot be avoided. The restart, which typically takes place at the end of the update process, interrupts the network connection. This critical situation can occur, when for example a home gateway performs a restart and terminates the internet connection of the other connected devices 6, which may not yet have finished their update. The restarting home gateway providing network connectivity to a variety of home devices, such as set top boxes, television sets, or other home appliances for example a refrigerator, etc. interrupts the network connection. The firmware downloads of the other devices, which may still be ongoing, are interrupted, which may cause fatal problems within the operating system of the devices 6. In addition to this, the stand-alone action of each device 6 may lead to interconnectivity problems, which are due to the different firmware versions running on the devices 6. For instance, the home gateway restarts its new firmware using an advanced data communication protocol while the set top box still runs the older version. This can lead to incompatibilities on the data link between the two devices.

Document US 2004/0083471 A1 discloses a method of upgrading the system software of a home appliance in a home network. This particular home network comprises a home server, which is in charge of coordinating and synchronizing the system software versions of all devices in the home network. This central entity, i.e. the home server, can avoid chaos situations during firmware updates. However, the home server has to be reconfigured after addition or removal of any device. The home network requires a high maintenance and is not flexible.

SUMMARY

It is an object of the invention to provide a method of updating at least two interconnected devices in a local network, a local network having at least two interconnected devices and a computer program product, which causes the local network to perform the method, wherein a flexible, seamless and reliable update of the system software of the devices should be possible. Furthermore, it is an object of the invention to provide a method of operating a remote management client and a method of operating a device in the local network, which allow a reliable, flexible and seamless update of the system software of the devices in the network.

In one aspect of the invention, a method of updating at least two interconnected devices in a local network is provided. In particular, the local network can be a company network, a facility network, an office network, a production site network or a home network. Within the context of this specification, all these types of networks will be generally referred to as a local network.

At a selected one of the devices acting as a remote management client, an update request and a resource location information of an update archive corresponding to the update request is received from a remote management server. The resource location information is sent from the remote management client to the other devices in the local network. For example, this resource location is an URL. A participation acknowledgement message is sent from the other devices participating in the update to the remote management client. At the participating devices, it is determined whether a next one of a predefined sequence of update statuses is reached. The other participating devices are notified that the next update status has been reached. When having reached this next update status, the device pauses until all other participating devices have notified that they also have reached the same update status.

Advantageously, a synchronized update of multiple devices in a local network can be performed. Service interruptions at some devices potentially blocking the update of other devices are avoided. Furthermore, there is no need for a centralized update manager. The devices dynamically and autonomously learn of the presence of the other updating devices. They autonomously synchronize the update process across the entire local network and during the full time period, which the update process takes. The update of the devices in the local network is performed very flexibly. A new device can be inserted to or removed from the local network in a seamless way. Advantageously, there are no dependencies on other subsystems or devices deployed before.

Even a subsystem of devices can be updated. The subsystem is handled similar to a single device. The term update, frequently used throughout this specification, refers to either an update or an upgrade of the system software or firmware of the device. An update shall be simply a newer firmware version. An upgrade can also be a newer or higher firmware version; however, it will typically include additional or enhanced functionality. These aspects advantageously apply to all embodiments of the invention.

According to an advantageous embodiment of the invention, the remote management client checks whenever at least one of the participation acknowledgement messages is received. If so, at least a header of the update archive is downloaded from the remote management server. Advantageously, a single download archive comprises the firmware images for the devices in the local network. The archive can be a single file. Furthermore, the participating devices can request at least the header of the update archive from the remote management client. This can be the first bytes of the update archive residing at the resource location. The commonly used firmware download protocol HTTP allows the client to request only a portion of the update archive, e.g. the header. After having received this header, the participating device analyzes the content of the header and determines whether to continue the update as a continuing device.

The analysis of the header can comprise the determination of a version of a system software of the device. When the archive comprises a newer or higher version of the system software, the device continues the update as a continuing device.

In addition to this, the analysis of the header can comprise a determination of the provider of the system software. When the provider is accepted by the device, it will proceed with the update. If the provider of the system software is not accepted by the individual device, for example because the provider is not a trusted provided or does not fulfill predefined security guidelines, the device refuses the further participation in the system software update. Advantageously, a synchronized update of the system software can be performed without threatening the security of the individual devices.

According to still another advantageous embodiment of the invention, the remote management client parses the update archive into at least one segment, which comprises update data being designated to an individual continuing device. This at least one segment is sent to the corresponding continuing device. Furthermore, at each continuing device, whenever it has successfully finished the update, it notifies a success information message to the remote management client. After having received the success information messages from all continuing devices, the remote management client forwards at least one success information message to the remote management server. In other words, the remote management server receives feedback messages, which are indicative of a successful system update, for every individual device in the local network. According to an embodiment, one single file is sent from the remote management client to the remote management server. This single file success information message indicates the successful update of all devices, which have sent a success information message to the remote management client. It is, however, also possible that the remote management client forwards the success information messages, which it receives from the devices, to the remote management server.

According to still another advantageous aspect of the invention, a local network comprising at least two interconnected devices is provided. In particular, this local network may be a home network. A selected one of the at least two devices is equipped and configured as a remote management client. It communicates with a remote management server. The remote management client is configured to receive an update request and a resource location information of an update archive corresponding to the update request from the remote management server. The remote management client is further equipped and configured to distribute the resource location information (for example an URL) to the other devices in the local network. The devices participating in the update are equipped and configured to send a participation acknowledgement message to the remote management client. Furthermore, the participating devices each comprise a state checker, which is configured to determine whenever a next one of a predefined sequence of update statuses is reached. In addition to this, the state checker is configured to notify the other participating devices that this next status has been reached. The participating devices further comprise an updater, which is configured to pause the update in the present update status until all other participating devices have notified that they also reached the same update status.

Advantageously, a flexible local network allowing seamless integration and removal of devices further having the capability of performing a synchronized system software update can be provided. Further advantages of the local network are similar to the advantages, which have been mentioned with respect to the method of updating the at least two interconnected devices in the local network and shall therefore not be repeated.

According to an advantageous embodiment of the invention, the updater of the remote management client is further configured to check whether at least one participation acknowledgement message is received. The remote management client further comprises a downloader, which is configured to download at least a header of the update archive from the remote management server. The updater of the other participating devices in the local network, according to this embodiment of the invention, is further configured to request at least the header of the update archive from the remote management client. The other participating devices analyze the received header to determine whether the device continues the update as a continuing device. In particular, the participating devices are configured, i. e.

the updaters of the participating devices are configured, to determine a version of the system software of the device. The updater analyzes whether the archive comprises a newer version of the system software of said device. If so, the participating device continues the update. In particular, the updater will also verify whether the update archive, i. e. the firmware image, is compatible with the particular device. This advantageously prevents loading a non-working firmware on a device by accident.

Advantageously, the update archive can be a single file comprising a header specifying the type and content of subsequent segments of the update archive. In particular, each segment comprises a firmware image of a system software update for a device in the local network. The downloader of the remote management client is configured to parse the update archive into at least one segment, which is designated to an individual continuing device. At least this segment of the update archive is subsequently sent to the designated device.

The updater at each continuing device can be further configured to determine whenever the device has finished the update. The updater notifies a success information message to the remote management client. The updater of the remote management client receives the success information messages of all continuing devices in the local network. After having received all these messages from the continuing devices, the collected success information messages are forwarded to the remote management server.

Same or similar advantages as those already mentioned with respect to the method of updating at least two interconnected devices in a local network, apply in a same or similar way to the local network system and are therefore not repeated.

In still another aspect of the invention, a method of operating a remote management client in a local network is provided. In particular, the local network may be a home network. The local network comprises at least two interconnected devices wherein one of the devices is selected and configured as a remote management client. It communicates with a remote management server. The remote management client in the local network receives an update request and a resource location information from the remote management server. It is understood, this resource location information corresponds to the update archive corresponding to the update request. Furthermore, the remote management client distributes the resource location information, for example the URL, to the other devices in the local network. Subsequently, it receives participation acknowledgement messages from the other devices, which participate in the update. The remote management client checks whether at least one participation acknowledgement message is received and if so, it downloads at least the header of the update archive from the remote management server.

In an advantageous embodiment of the invention, the remote management client sends at least the header of the update archive to the participating devices. This is performed upon request. It further parses the update archive into at least one segment, which comprises data designated to an individual device, and sends the at least one segment to the designated device.

In another embodiment of the invention, the updater of the participating devices is configured to initiate a download of the header of the update archive. The device receives the resource location information from the remote management client, for example an URL. Subsequently, the individual continuing device is able to download the first few bytes of the update archive, e. g. the header, from the received resource URL.

According to still another aspect of the invention, a method of operating a device in a local network is provided. In particular, the local network may be a home network. The local network comprises at least two interconnected devices, wherein one of these at least two devices is selected and configured as a remote management client. The remote management client communicates with a remote management server. The device in the local network according to this aspect of the invention receives a resource location information of an update archive, corresponding to an update request, from the remote management server of the local network. It sends a participation acknowledgement message to the remote management client, if the device participates in the update. The device determines whenever a next one of a predefined sequence of update statuses is reached. It notifies to the other participating devices that it has reached this next status. When having reached the update status, the device stops the update and pauses until all other participating devices have notified that they have also reached the same update status.

Advantageously, a synchronized update of the system software of the devices in the local network is performed. New devices can be added to or removed from the local network in a seamless way. Advantageously, there is no need for a centralized update server in the local network, which would be in charge of managing the update process. The individual devices in the local network are configured to communicate with each other in that the update is performed step-by-step in a controlled process, which avoids uncontrolled operation or failure of the local network.

According to an advantageous embodiment of the invention the device in the local network requests to receive at least a header of the update archive from the remote management client. After having received the header, the device analyzes the header with respect to a version of the system software, which is offered in the update. It determines a version of the system software currently running on the device and analyzes whether the archive comprises a newer or higher version of the system software. If a newer version of the system software is offered, the device continues the update. If not, it refuses to continue with the update.

According to still another advantageous aspect of the invention, a computer program product, which is stored on a computer-readable medium, is provided. The computer program product causes a local network comprising at least two interconnected devices to perform the method of updating the at least two interconnected devices in the local network according to aspects of the invention.

Same or similar advantages as those mentioned with respect to this method, apply in a same or similar way to the computer program product according to aspects of the invention.

BRIEF DESCRIPTION OF DRAWINGS

Further aspects and features of the invention ensue from the following description of the preferred embodiments of the invention with reference to the accompanying drawings, wherein.

DETAILED DESCRIPTION OF EXAMPLE EMBODIMENTS

Figure 2:
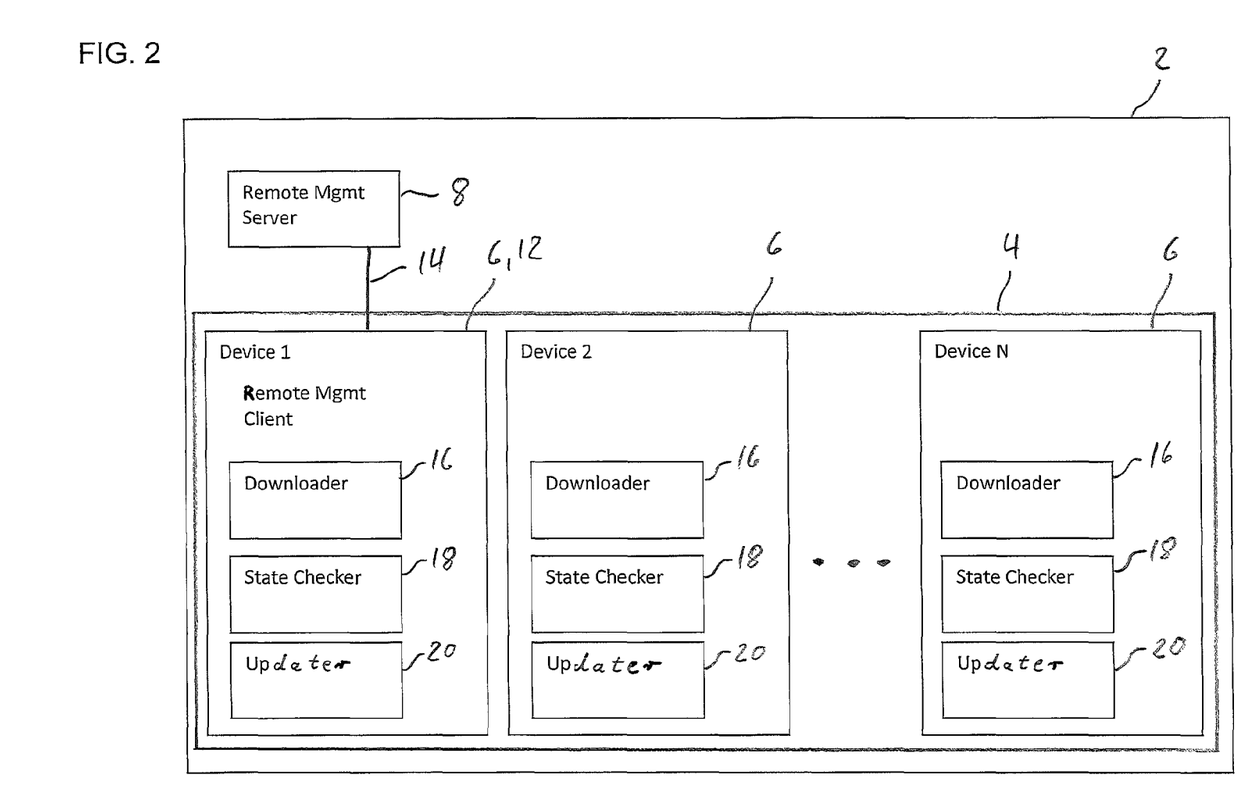
FIG. 2 is a simplified network system comprising a local network, according to an embodiment of the invention.

FIG. 2 is a simplified and schematic network system 2 comprising a local network 4 and a remote management server 8. By way of an example only, the local network 4 comprises an arbitrary number N of devices 6, denoted: "Device 1", "Device 2 . . . "Device N". One of the devices 6 in this local network 4 is selected and configured as a remote management client 12. According to the embodiment of FIG. 2, Device 1 is configured as the remote management client 12.

The local network 4 can be a company network, a facility network, an office network, a production site network or in particular a home network. Within the context of this specification, all these types of networks will be generally referred to as a local network 4. This advantageously applies to all embodiments of the invention.

The remote management client 12 communicates with the remote management server 8 via a data link 14. This can be a commonly known data transmission line, which is operated using frequently known protocols. In particular, the data link 14 may use a data connection via the internet.

In particular, the devices 6 in the local network 4 may be customer premises equipment connected to each other in the local network 4. For example, a device 6 can be a home gateway, a set top box, a television set or another modern household appliance, such as a refrigerator etc. Basically, the devices 6 of the local network 4 are equipped with similar technical functionality. Consequently, an arbitrary device 6 can be configured as the remote management client 12.

Each device 6 comprises a downloader 16, which is in charge of downloading data from a remote management server 8 based on resource location, offset and data size. Furthermore, there is a state checker 18, which is specific to each device 6. The state checker 18 is capable of recognizing the update activity on the device 6. As such, the state checker 18 is able to indicate when the operating system of the device 6 can be considered ready for data service interruption when needed. In addition to this, each device 6 comprises an updater 20, which is an entity handling the update requests available in the local network 4. The updater 20 of each device 6 is in charge of controlling the update process in particular the update of the system software of the devices 6, in the local network 4. The update is managed and controlled in a distributed manner as will be outlined further below.

Figure 3:
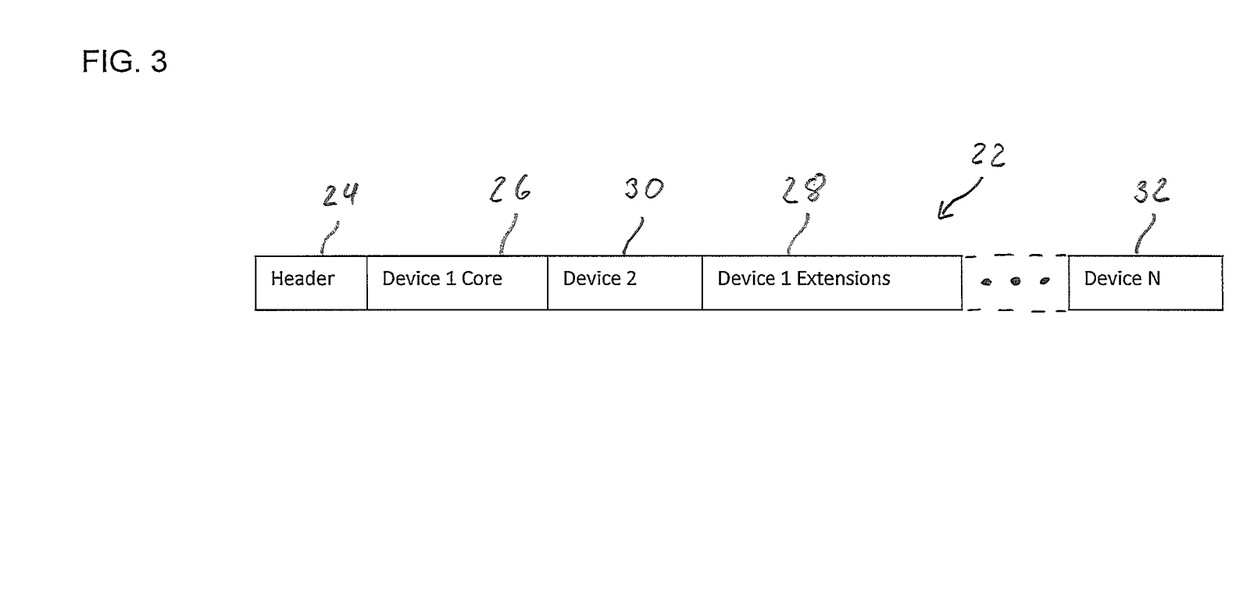
FIG. 3 is a simplified update archive, according to an embodiment of the invention.

In FIG. 3, there is a simplified update archive 22 comprising firmware or system software images (one or more per device 6 in the local network 4). The update archive 22 is downloaded from the remote management server 8 via the data link 14 to the remote management client 12. The update archive 22 has a header 24 comprising information and a clear identification of the firmware images the update archive 22 contains. The header 24 specifies the type and offset of the firmware images, which can be found in the update archive 22. By way of an example, the update archive in FIG. 3 comprises a first segment 26, which is designated to the core of the first device (Device 1). In addition to this, there is another segment 28 comprising a firmware image, which is designated to the extensions of this first device. By way of an example, there are further segments 30, 32 comprising firmware images for a $2^{nd}$ and an $N^{th}$ device.

Figure 4:
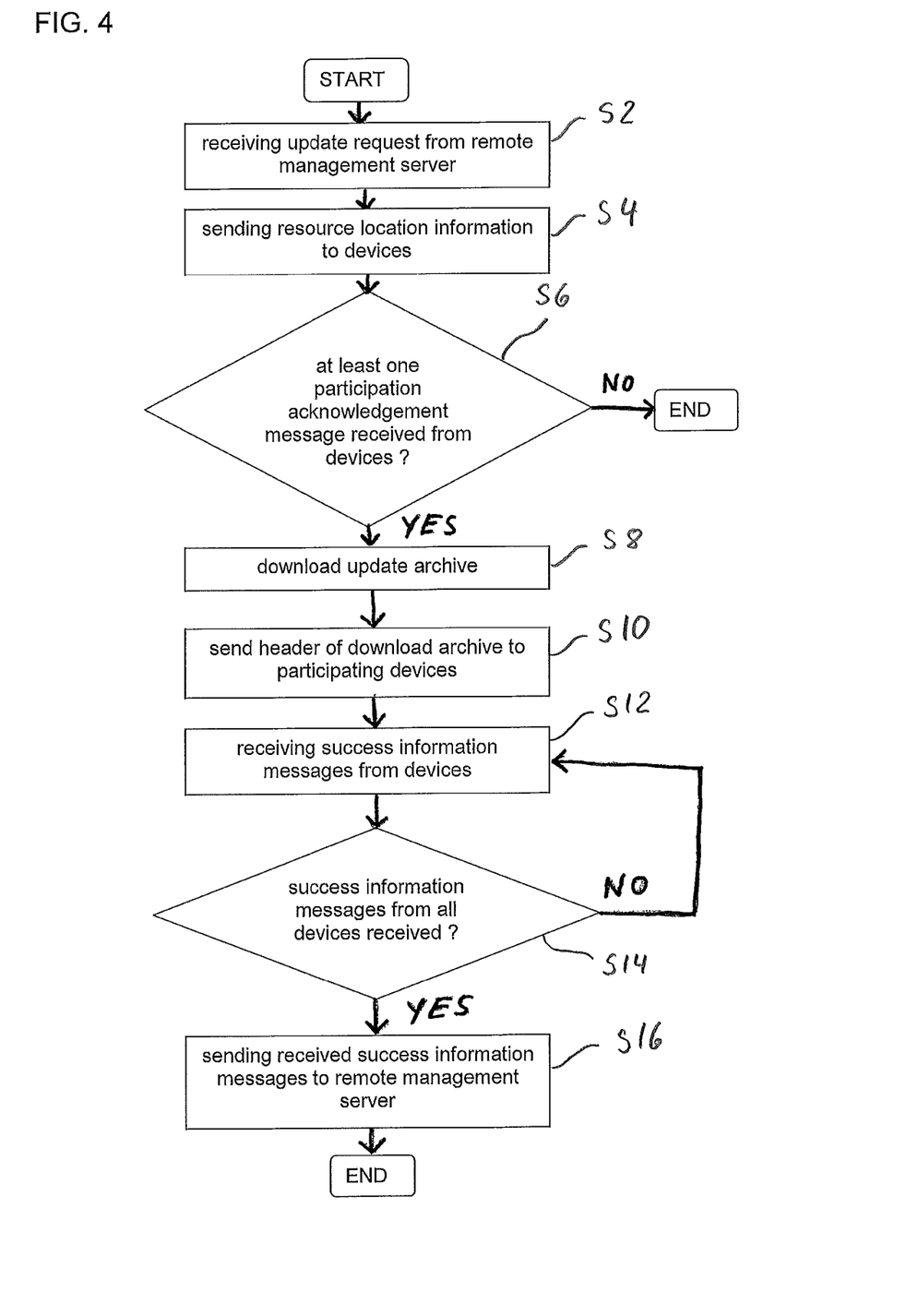
FIG. 4 is a flowchart illustrating a method of operating a remote management client in a local network according to an embodiment of the invention and FIGS. 5 to 7 show a flowchart for a method of operating a device in a local network, according to another embodiment of the invention.

FIG. 4 is a flowchart illustrating the operation of a remote management client 12 in a local network 4 according to an embodiment of the invention. The operation of this entity during a system update will be explained.

The update commences in that the remote management client 12, in step S2, receives an update request from the remote management server 8. The update request typically comprises the location, for example an URL, of the update archive 22 containing one or more firmware images for the devices 6 in the local network 4. In step S4, the remote management client 12 communicates the resource location information, for example the URL of the update archive 22, to the other devices 6 of the local network 4.

Subsequently, the remote management client 12, in step S6, waits for participation acknowledgement messages, which are sent from the other devices 6 of the local network 4 to the remote management client 12. If no participation acknowledgement message is received, the update process terminates. When at least one participation acknowledgement message from one of the other devices 6 is received by the remote management client 12, the remote management client 12 downloads, in step S8, at least the header 24 of the update archive 22 from the remote management server 8. Subsequently, in step S10 the remote management client 12 communicates the header 24 of the update archive 22 to the other devices 6 of the local network 4.

The devices 6 of the local network 4 perform a distributed and synchronized update, which is performed step-by-step. This will be explained in more detail when making reference to FIGS. 5 to 7 further below. After finishing the update process, the devices 6 communicate a success information message to the remote management client 12. Consequently, the remote management client 12 receives, in step S12, these success information messages from the other devices 6. The remote management client 12 checks, in step S14, whether success information messages are received from all devices 6 of the local network 4. The steps S12 and S14 are repeated until the success information messages are received for all devices 6 in the local network 4. If this is accomplished, the received and collected success information messages are communicated, in step S16, from the remote management client 12 to the remote management server 8. The update of the system software or of the firmware of the devices 6 in the local network 4 is successfully finished.

Figure 5:
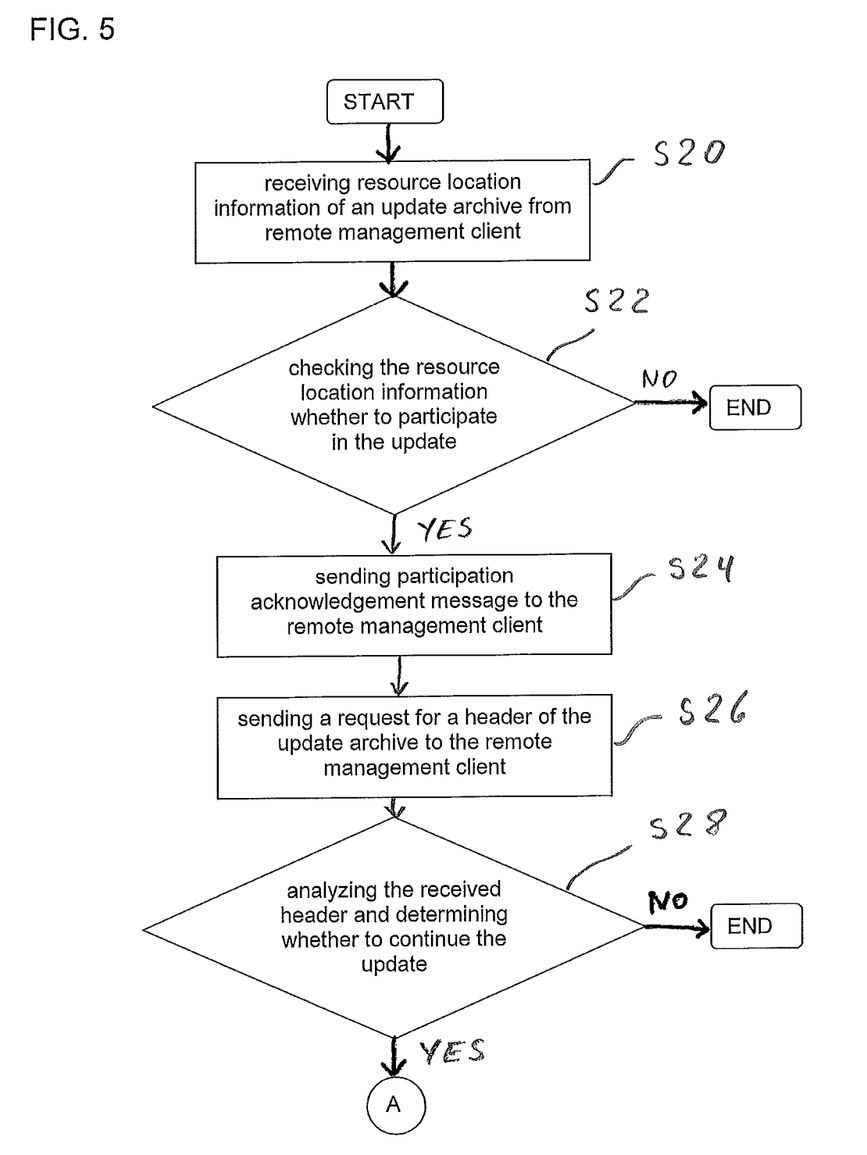
Figure 6:
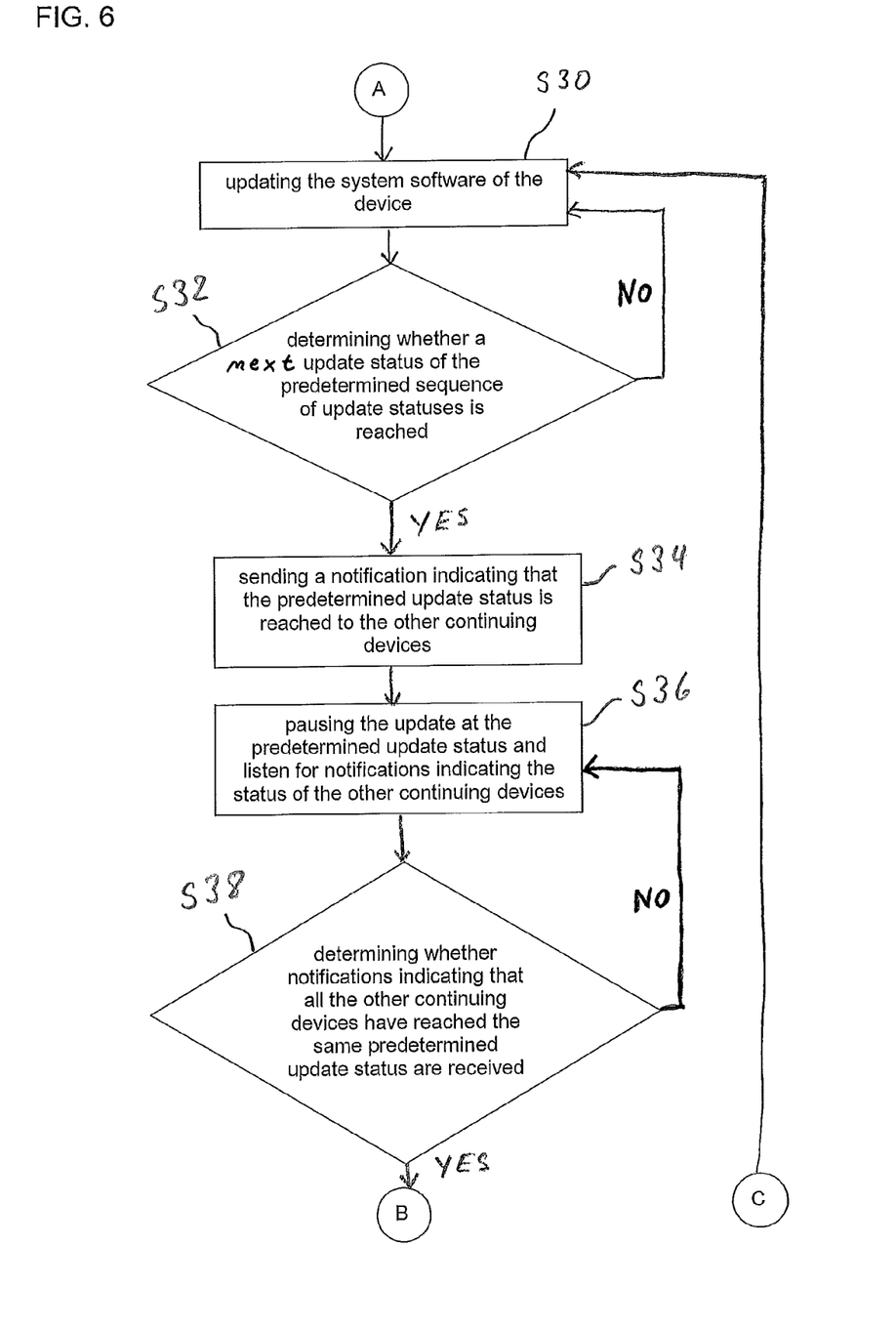
Figure 7:
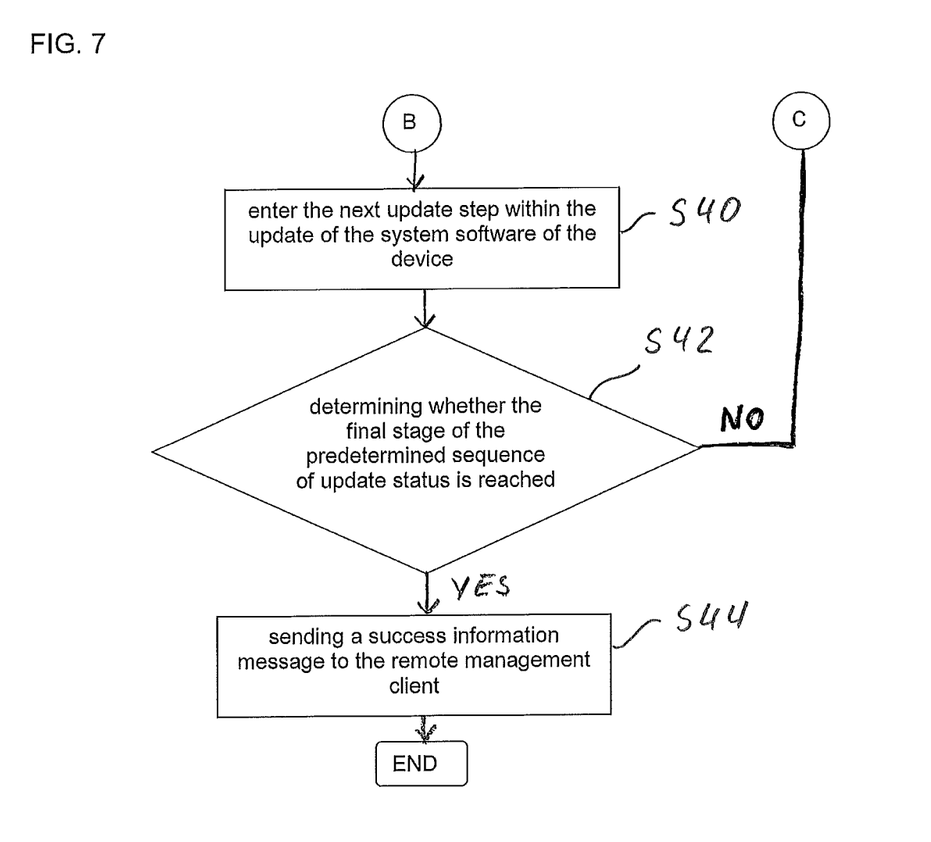

FIGS. 5 to 7 illustrate a method of operating a device 6 in a local network 4, according to an embodiment of the invention. The flowcharts in the individual figures are connected at the interconnection points A-A, B-B and C-C.

First of all, the device 6 receives, in step S20, a resource location information, for example an URL, of an update archive 22 from the remote management client 12. In step S22, the device 6 checks the resource location information and decides whether to participate in the update. If the device 6 refuses to participate, for example because the provider of the firmware update does not comply with the internal security guidelines of the device 6, the device 6 terminates the update process. When the device 6, however, decides to proceed with the update, it communicates, in step S24, a participation acknowledgement message to the remote management client 12.

Subsequently, the device 6 communicates, in step S26, a request for the header 24 of the update archive 22 to the remote management client 12. After having received the header 24, the device 6 analyzes the content of the header 24 and determines whether to continue with the update process, in step S28. This analysis can comprise a determination of the system software version, which is presently running on the device 6. When the update archive 22 comprises a firmware image of a newer or higher version, the update process is continued. When the system software of the device 6, however, is the newest version available, the device 6 refuses to participate further in the update process and terminates the update in step S28.

When the update is continued, as shown in the transition A-A of the flowchart to the second part thereof in FIG. 6, the device 6 updates its system software in step S30. For the devices 6 in the local network 4, according to an embodiment of the invention, there is a pre-determined sequence of update statuses.

For example, the predefined sequence of update statuses includes:

Downloading the update archive. It is also possible that only a part of the update archive, which corresponds to the device is downloaded.

Verifying the downloaded update or firmware. This can be performed by a keyed hash integrity check.

Writing the update to device persistent memory

Awaiting time to reboot. This may require a user configuration.

Reboot the device to load the new updated system software version.

New systems software loaded, update complete.

During the update process, each device 6 determines in step S32 whether a next update status of this pre-determined sequence of update statuses is reached.

If not, the device 6 continues updating its system software. When a next one of the pre-determined statuses is reached, the device 6 communicates, in step S34, a notification indicating that this pre-determined update status is reached, to the other continuing devices 6.

Subsequently, the device 6 stops the update process and pauses in step S36, listening for notifications indicating the update status of the other continuing devices 6 in the local network 4. The device 6 determines, in step S38 whether notifications indicating that all the other continuing devices 6 have reached the same pre-determined update status are received. In other words, the device 6 stops the update process until all devices 6 in the local network 4 have reached the same update status. This advantageously avoids chaos situations during the system update. This situation might occur because, during the update, data service interruptions can be necessary. When for example a home gateway interrupts the data service while another device which is provided with data connectivity to the outer world via the home gateway still downloads a firmware image, this can lead to severe problems. However, in the local network 4 according to embodiments of the invention, this critical situation is carefully handled and unexpected service interruptions are advantageously avoided. All devices 6 in the local network 4 update their system software stepwise and in a synchronized manner.

When all devices 6 have reached the same update status, the device 6 will enter the next step of the update, as shown in the transition B-B to FIG. 7; step S40. Subsequently, the device 6 determines, in step S42, whether the final stage of the pre-determined sequence of update statuses is reached. If not, the device 6 continues updating the system software, see transition C-C back to FIG. 6; step S30. The stepwise update of the system software of the devices 6 is repeated and continued until all devices 6 have reached the final stage of the system software update. When this final stage is reached, a success information message is communicated in step S44 to the remote management client 12. The update of the system software is successfully accomplished.

Although the invention has been described hereinabove with reference to specific embodiments, it is not limited to these embodiments and no doubt further alternatives will occur to the skilled person that lie within the scope of the invention as claimed.

The invention claimed is:

1. A method of updating a plurality of devices in a local network the method comprising receiving, from a remote management server, at a selected one of the plurality of devices acting as a remote management client, an update request and a resource location information of an update archive corresponding to the update request, sending, by the remote management client, the resource location information from the remote management client to participating devices participating in the update, the participating devices being the other plurality of devices in the local network, receiving, by the remote management client, a participation acknowledgment message from the participating devices participating in the update to the remote management client, determining, at the participating devices, when a next status out of a predefined sequence of update statuses is reached, and if so, notifying the other participating devices that the next status has been reached, pausing the update in the next status until all other participating devices have notified that they also have reached a same next status, and when the remote management client has received at least one participation acknowledgment message, downloading at least a header of the update archive from the remote management server.

2. The method of claim 1, further comprising:

requesting, at the participating devices, to receive at least the header of the update archive from the remote management client, and after having received the header, analyzing the content of the header and determining whether to continue the update as a continuing device.

3. The method of claim 2, further comprising:

determining, at the continuing devices, a version of a system software of the continuing device, analyzing whether the update archive comprises a newer version of the system software and if so, continuing the update.

4. The method according to claim 2, further comprising:

parsing, at the remote management client, the update archive into at least one segment comprising update data designated to an individual continuing device, and sending the at least one segment of the update archive to the designated individual continuing device.

5. The method according to claim 2, further comprising:

sending a success information message to the remote management client when each continuing device has finished the update, forwarding at least one success information message to the remote management server after receiving the success information messages from all continuing devices.

6. A non-transitory computer readable medium storing a computer program product, which causes a plurality of devices in a local network to perform the method according to claim 1.

7. A local network comprising:

a plurality of devices, of which one of the plurality of devices is selected and configured as a remote management client for communicating with a remote management server;

the remote management client being configured to receive, from the remote management server, an update request and a resource location information of an update archive corresponding to the update request, and to distribute the resource location information to participating devices participating in the update, the participating devices being the other plurality of devices in the local network; and the participating devices being configured to:

send a participation acknowledgment message to the remote management client, when a next status out of a predefined sequence of update statuses is reached, notify the other participating devices that the next status has been reached, and pause the update in the next status until all other participating devices have notified that they also have reached a same next status, wherein the remote management client, when at least one participation acknowledgment message is received, downloads at least a header of the update archive from the remote management server.

8. The local network of claim 6, wherein the participating devices are further configured to request at least the header of the update archive from the remote management client and to continue the update as a continuing device when the update archive comprises a newer version of the system software of the participating device, the version of the system software in the update archive being comprised in the received header.

9. The local network of claim 8, wherein the update archive is a single file comprising a header specifying the type and content of subsequent segments of the update archive, wherein each segment comprises a firmware image of a system software update for a device of the local network, wherein the remote management client is further configured to:

parse the update archive into at least one segment comprising update data designated to an individual continuing device, and transmit the at least one segment of the update archive to the designated individual continuing device.

10. The local network according to claim 8, wherein each continuing device is further configured to send a success information message to the remote management client when the device has finished the update, and the remote management client is further configured to receive the success information messages from all continuing devices, and to forward at least one success information message to the remote management server after having received the success information messages from all continuing devices.

11. A method of operating a remote management client in a local network comprising a plurality of devices, wherein one of the plurality of devices is selected and configured as the remote management client communicating with a remote management server, the method comprising:

receiving, from the remote management server, an update request and a resource location information of an update archive corresponding to the update request, distributing the resource location information to participating devices participating in the update, the participating devices being the other plurality of devices in the local network, receiving participation acknowledgment messages from the participating devices participating in the update, and when at least one participation acknowledgment message is received, downloading at least a header of the update archive from the remote management server, and sending at least the header of the update archive to the participation devices, upon request.

12. The method of operating the remote management client according to claim 11, further comprising:

parsing the update archive into at least one segment comprising update data designated to an individual device, and sending the at least one segment of the update archive to the designated individual device.

13. A method of operating a device in a local network comprising a plurality of devices, of which one of the plurality of devices is selected and configured as a remote management client communicating with a remote management server, the method comprising:

receiving, at the device, a resource location information of an update archive corresponding to an update request of the remote management server from the remote management client, sending a participation acknowledgment message to the remote management client, if the device participates in the update, when a predefined sequence of update statuses is reached, notifying the other participating devices that the next status has been reached, pausing until all other participating devices have notified that they also have reached a same next status, requesting to receive at least a header of the update archive from the remote management client, and continuing the update when the update archive comprises newer version of the system software on the device, the header comprising a version of a system update in the update archive.

14. A remote management client in a local network that comprises a plurality of devices one of the plurality of devices being selected and configured as the remote management client for communicating with a remote management server, the remote management client comprising a processor configured to:

receive, from the remote management server, an update request and a resource location information of an update archive corresponding to the update request, distribute the resource location information to participating devices participating in the update, the participating devices being the other plurality of devices in the local network, receive participation acknowledgment messages from the participating devices participating in the update, and when at least one participation acknowledgment message is received, download at least a header of the update archive from the remote management server and send at least the header of the update archive to the participating devices, upon request.

15. A device connected to a local network comprising a plurality of devices, of which one of the plurality of devices is selected and configured as a remote management client for communicating with a remote management server, the device comprising a processor configured to:

receive a resource location information of an update archive corresponding to an update request of the remote management server from the remote management client, send a participation acknowledgment message to the remote management client, for participating devices participating in the update, when a next status out of a predefined sequence of update statuses is reached, notify the participating devices that the next status has been reached, and pause the update until all participating devices have notified that they also have reached a same next status, and wherein, when the remote management client received at least one participation acknowledgement message, downloading at least one header of the update archive from the remote management server and sending at least the header of the update archive to the participating devices, upon request.

* * * * *